United States Patent Office 3,362,890
Patented Jan. 9, 1968

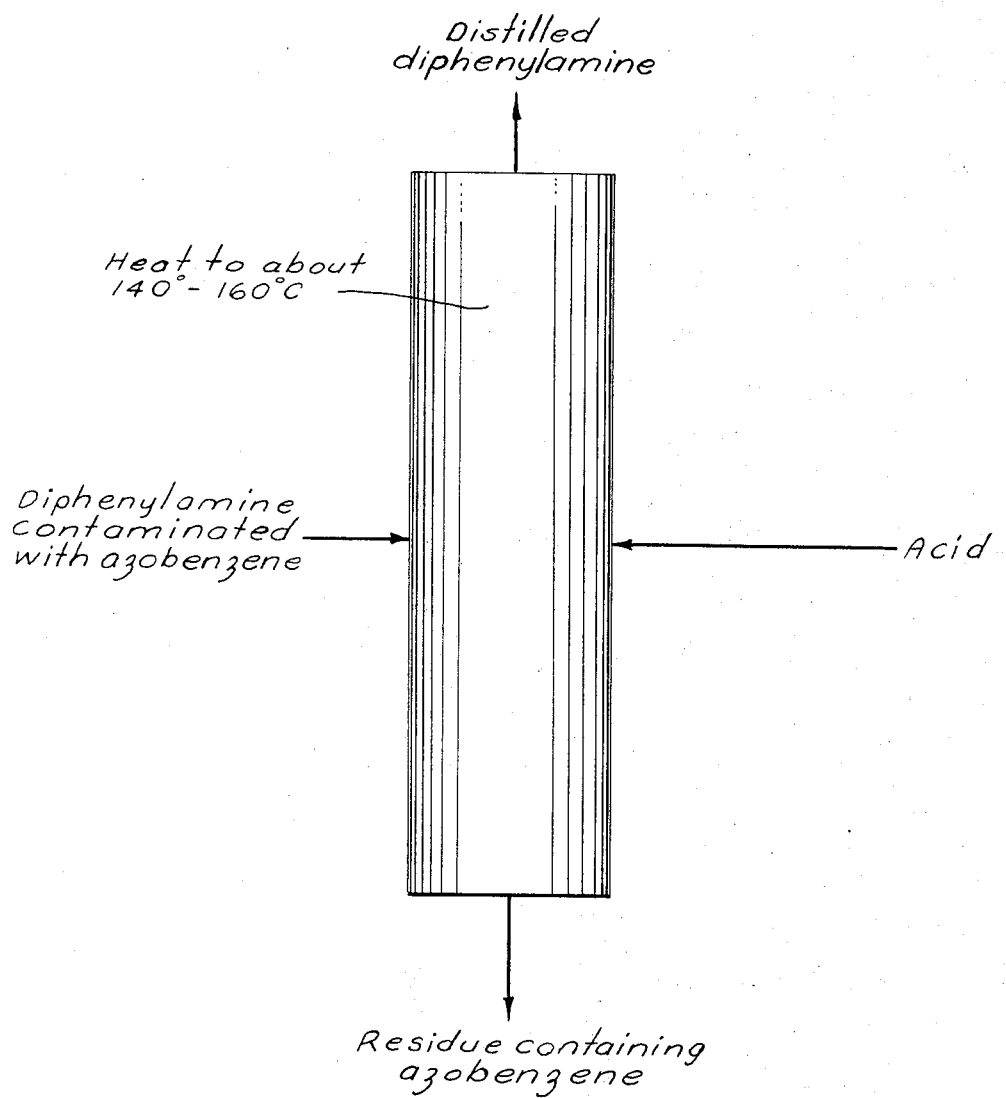

3,362,890
DIPHENYLAMINE DISTILLATION IN
PRESENCE OF AN ACID
Theodore E. Majewski, Midland, and Daniel W. Tarkowski, Bay City, Mich., assignors to The Dow Chemical Company, Midland, Mich., a corporation of Delaware
Filed Feb. 18, 1965, Ser. No. 433,804
15 Claims. (Cl. 203—29)

ABSTRACT OF THE DISCLOSURE

The invention a process for purifying diphenylamine from its major impurity, azobenzene. The addition of a small amount of an acid to the contaminated diphenylamine holds back the azobenzene during distillation.

---

The invention relates to a method of separating mixtures containing diphenylamine and azobenzene. More particularly, the present invention relates to a process for the purification of diphenylamine which is contaminated with azobenzene.

In the manufacturing of aniline by the ammonolysis of chlorobenzene, diphenylamine is produced as a useful by-product. However, azobenzene is also produced during the ammonolysis and cannot be separated from the diphenylamine by simple distillation.

It has now been found that the addition of an acid to mixtures contaning diphenylamine and azobenzene enables the diphenylamine to be separated from the acidic mixture by distillation techniques. It is believed that the acid forms a complex with the azobenzene (in preference to the formation of an amine salt with the diphenylamine) and that this ozobenzene complex is stable enough to allow the removal of the diphenylamine by subjecting the acid mixture to distillation. The attached schematic drawing shows a flow-diagram of the claimed method.

The term "acid," as used herein, is meant to include organic acids, inorganic acids and Lewis acids. Typical organic acids which can be used in the process include the toluenesulfonic acids (especially p-toluenesulfonic acid), benzenesulfonic acid, monochloroacetic acid, dichloroacetic acid and oxalic acid. Organic acids with an ionization constant of from about $100 \times 10^{-5}$ to about $600 \times 10^{-5}$ form a preferred subclass of organic acids. Typical Lewis acids which may be used are the Friedel-Crafts catalysts such as $BF_3$, $AlCl_3$, $AlBr_3$, $PCl_3$, $CuCl_2$, $FeCl_3$, $HgCl_2$, $SnCl_2$, $SnCl_4$, $TiCl_4$ $SbCl_3$ and $ZnCl_2$, for example. Typical inorganic acids which may be used include the mineral acids such as $H_2SO_4$ and HCl. Any acid which forms a stable complex with azobenzene or products reaction products which have boiling points and decomposition points higher than the boiling point of diphenylamine at a given pressure may be used. Concentrated $H_2SO_4$ is a preferred acidic reagent for use in the process of the invention.

According to the process of the invention, a mixture containing diphenylamine and azobenzene is contacted with an amount of acid sufficient to react with all of the azobenzene present in the mixture. The appearance of a slight excess of acid in the reaction mixture after reaction with the azobenzene indicates that the azobenzene has been complexed and that no further acid addition is necessary. Generally, the temperature of the mixture containing diphenylamine and azobenzene will rise during the addition of the acid. The reaction mixture may also be heated during or after the addition of the acid. The use of slightly more than a stoichiometric amount of acid is not detrimental to the process. The addition of a large excess of acid tends to produce side products. These side products, however, are not harmful to the process since (unlike azobenzene) they may be conveniently separated from the diphenylamine by conventional distillation techniques. After contacting the diphenylamine-azobenzene mixture with acid, the acid-treated mixture is then subjected to distillation to remove the diphenylamine. By this method, the amounts of azobenzene which appear in the final diphenylamine product have been reduced to less than 150 parts per million.

The process of the invention is especialy suitable for the purification of diphenylamine which contains up to about five to twenty-five percent by weight of azobenzene (based upon the total amount of diphenylamine plus azobenzene). The separation of the diphenylamine from the acid-treated mixture containing diphenylamine and azobenzene is conveniently completed by subjecting the mixture to distillation at temperatures of from about 140° to 160° C., usually at reduced pressures (0.5 to 40 mm. Hg).

The following examples are submitted for the purpose of illustration only and are not to be construed as limiting the scope of the inventin in any way.

Example I

Three grams of 90 percent by weight benzenesulfonic acid (.015 mole) was added to 52.5 grams of diphenylamine containing 5 percent by weight (2.6 grams; .0144 mole) of azobenzene and the mixture was heated to 150° C. A reaction took place which caused the temperature to rise to 230° C. The acid-treated mixture was cooled to about 150° C. and subjected to distillation at 150° C. under a pressure of 7–9 mm. of Hg to yield 39.9 grams of diphenylamine containing less than 150 p.p.m. azobenzene.

Example II

Ten grams of 90.0 percent by weight benzenesulfonic acid (0.057 mole) was added to 51.2 grams of diphenylamine containing 5 percent azobenzene (2.56 grams; 0.0141 mole) and the mixture was heated to 80° C. The temperature then rose to 150° C. The mixture was subjected to distillation at 149°–150° C. at 7–9 mm. of Hg to give 40.0 grams of diphenylamine containing less than 150 p.p.m. azobenzene.

Example III

Four grams of 90 percent by weight p-toluene-sulfonic acid (0.02 mole) was added to 53.9 grams of diphenylamine containing 5.0 percent by weight azobenzene (2.695 grams; 0.0148 mole) and the mixture was heated. The temperature rose to 180° C. The acid-treated mixture was subjected to distillation at approximately 10 mm. of Hg and 152° C. Diphenylamine containing less than 150 p.p.m. of azobenzene was obtained.

Example IV

Ten grams (.106 mole) of monochloroacetic acid was added to 50.0 grams of diphenylamine containing 3.7 percent by weight (1.85 grams; .0102 mole) of azobenzene. The mixture was heated to 190° C., cooled and the reaction mixture then subjected to distillation at a temperature of 160° C. at 7–9 mm. of Hg. The diphenylamine obtained after the distillation was completed contained 0.1 percent by weight of azobenzene.

Example V

Ten grams (.075 mole) of dichloroacetic acid was added to 50.0 grams of diphenylamine containing 3.7 percent by weight (1.85 grams; .0102 mole) of azobenzene. The mixture was heated to 90° C. At this point, a reaction occurred (as evidenced by a temperature rise to 145° C. with the formation of a blue reaction mixture). This mixture was subjected to distillation at 156° C. under a pressure of approximately 8.5 mm. of Hg. The diphenylamine recovered from the distillation column contained no detectable amount of azobenzene.

*Example VI*

In a manner similar to the preceding examples, a 10 gram sample (.238 mole) of oxalic acid was added to a reaction vessel containing 50 grams of diphenylamine contaminated with 1.85 grams of azobenzene and equipped with a means for temperature control and stirring. The mixture was heated to 130° C. and held at this temperature for one-half hour. The reaction mixture was then subjected to distillation at 130° C. under a pressure of 2.5 mm. of Hg to separate the diphenylamine. The diphenylamine obtained contained 0.3 percent by weight of azobenzene.

*Example VII*

To 25 grams of crude diphenylamine containing 5 percent azobenzene (1.25 grams; 0.00686 mole) was added 1.0 gram (.0075 mole) of $AlCl_3$ at room temperature. The mixture was heated to 130° C. and held at this temperature for 15–30 minutes. The mixture was then subjected to distillation under reduced pressure (8 mm. of Hg; 151° C.). A colorless fraction weighing 18.6 grams was collected which contained less than 0.02 percent by weight of azobenzene.

*Example VIII*

To 25 grams of diphenylamine containing 5 percent (1.25 grams; .00686 mole) of azobenzene was added 5 grams (.0308 mole) of $FeCl_3$ at room temperature. The mixture was then heated to 130° C. and held there for 30 minutes. The mixture was then subjected to distillation using reduced pressure (8 mm. of Hg; 151° C.) producing 12.7 grams of diphenylamine containing less than 0.02 percent by weight of azobenzene.

*Example IX*

A 200 gram sample of a mixture composed of 93.7 weight percent diphenylamine, 5.5 percent azobenzene, 0.8 percent diphenyloxide and less than 0.05 percent aniline was treated with 17.55 grams of 95.5 percent (weight) $H_2SO_4$. The acidified mixture was held at 160° C. for 30 minutes. The acidified mixture was then subjected to distillation at a temperature of 155°–156° C. under a pressure of approximately 10 mm. of Hg using a 1 inch x 24 inch Vigreux column. Vapor phase chromatographic analysis showed no azobenzene in the distillate. For comparison, an identical 200 gram sample of the untreated mixture was subjected to distillation under identical conditions (155°–156° C., about 10 mm. of Hg) using the same distillation column (1 inch x 24 inch Vigreux column). More than 6.7 grams of azobenzene appeared in this distillate. Approximately 61 percent by weight of the azobenzene originally present in the untreated sample was carried over into the final distillate. Mole ratios of acid: azobenzene of from about 1:1 to 15:1 have been found to give excellent results in reducing or eliminating the amount of azobenzene in the distillate.

We claim as our invention:

1. A method of separating diphenylamine from a mixture containing diphenylamine and azobenzene which comprises contacting said mixture with an acid and subjecting the acid-treated mixture to distillation to remove the diphenylamine as distillate.

2. A method of separating diphenylamine from a mixture containing diphenylamine and azobenzene which comprises contacting said mixture with an amount of a Lewis acid sufficient to react with the azobenzene to form an acid-treated mixture and then subjecting said acid-treated mixture to distillation to remove diphenylamine as distillate.

3. The method of claim 2 wherein the Lewis acid is aluminum chloride.

4. The method of claim 2 wherein the Lewis acid is $BF_3$.

5. The method of claim 2 wherein the Lewis acid is iron chloride.

6. A method of separating diphenylamine from a mixture containing diphenylamine and azobenzene which comprises contacting said mixture with an amount of an organic acid sufficient to react with the azobenzene to form an acid-treated mixture and then subjecting said acid-treated mixture to distillation to remove diphenylamine as distillate.

7. The method of claim 6 wherein the organic acid is monochloroacetic acid.

8. The method of claim 6 wherein the organic acid is dichloroacetic acid.

9. The method of claim 6 wherein the organic acid is oxalic acid.

10. A method of separating diphenylamine from a mixture containing diphenylamine and azobenzene which comprises contacting said mixture with an amount of a mineral acid sufficient to react with the azobenzene to form an acid-treated mixture and then subjecting said acid-treated mixture to distillation to remove diphenylamine as distillate.

11. The process of claim 10 wherein the mineral acid is HCl.

12. The process of claim 10 wherein the mineral acid is $H_2SO_4$.

13. A process for the purification of a mixture containing diphenylamine and azobenzene which comprises contacting said mixture with at least a stoichiometric amount of p-toluenesulfonic acid to form an acid-treated mixture and subjecting said acid-treated mixture to distillation at a temperature of from 140° to 160° C. at a pressure of from 0.5 to 40 millimeters of mercury to remove the diphenylamine as distillate.

14. A method of purifying a mixture containing diphenylamine contaminated with azobenzene which comprises contacting said mixture with at least a stoichiometric amount of sulfuric acid to form an acidic mixture and subjecting said acidic mixture to distillation at a temperature of from 140° to 160° C. under a pressure of from 0.5 to 40 millimeters of mercury to remove the diphenylamine as distillate.

15. A method of purifying a mixture containing diphenylamine and azobenzene which comprises contacting said mixture with at least a stoichiometric amount of $FeCl_3$ to form an acid-treated mixture and subjecting said acid-treated mixture to distillation at a temperature of from 140° to 160° C. at a pressure of from 0.5 to 40 millimeters of mercury to remove the diphenylamine as distillate.

References Cited

UNITED STATES PATENTS

| | | | |
|---|---|---|---|
| 1,921,587 | 8/1933 | Semon et al. | 260—576 |
| 2,514,430 | 7/1950 | Webb et al. | 260—576 |
| 2,783,278 | 2/1957 | Thelin et al. | 260—576 |
| 3,063,980 | 11/1962 | Bloom | 260—580 |

WILBUR L. BASCOMB, JR., *Primary Examiner.*